June 2, 1959  J. O. ELY ET AL  2,889,001
VELOCITY DEPENDENT ACOUSTIC VELOCITY CORRECTION
Filed July 28, 1954  2 Sheets-Sheet 1
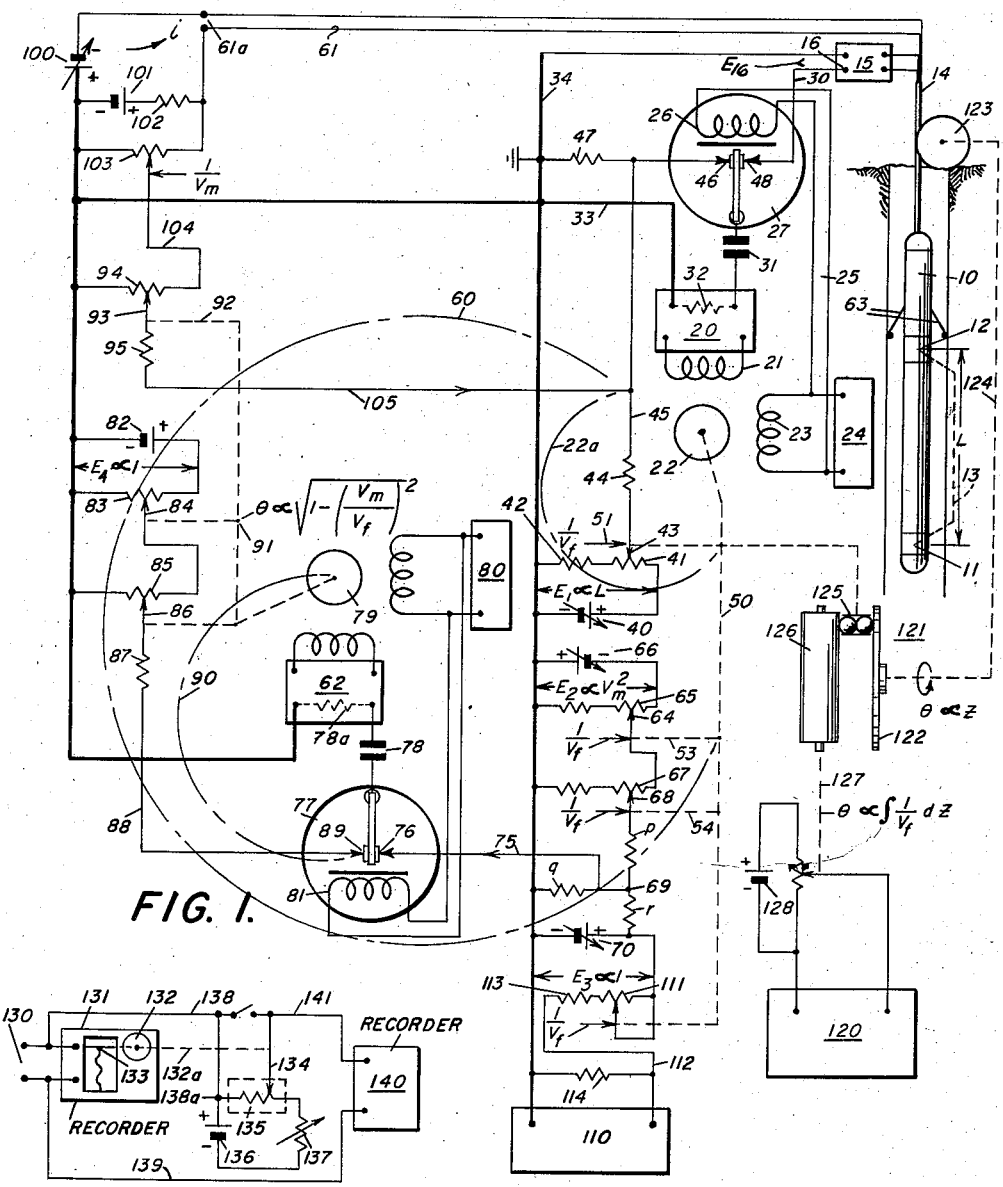
FIG. 1.
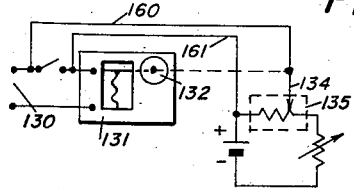
FIG.3.
FIG.5.
JOHN O. ELY
GERALD C. SUMMERS
FRANK C. KARAL, JR.
INVENTORS
BY D. Carl Richards
ATTORNEY June 2, 1959   J. O. ELY ET AL   2,889,001
VELOCITY DEPENDENT ACOUSTIC VELOCITY CORRECTION
Filed July 28, 1954   2 Sheets-Sheet 2

JOHN O. ELY
GERALD C. SUMMERS
FRANK C. KARAL, JR.
INVENTORS

BY D. Carl Richards
ATTORNEY

United States Patent Office 2,889,001
Patented June 2, 1959

2,889,001

VELOCITY DEPENDENT ACOUSTIC VELOCITY CORRECTION

John O. Ely, Gerald C. Summers, and Frank C. Karal, Jr., Dallas, Tex., assignors, by mesne assignments, to Socony Mobil Oil Company, Inc., a corporation of New York Application July 28, 1954, Serial No. 446,338

8 Claims. (Cl. 181—.5)

This invention relates to acoustic well logging and more particularly to the production of a voltage function which is substantially singularly dependent upon the acoustic compressional velocity of earth formations adjacent a borehole.

In prior application of Gerald C. Summers, Serial No. 192,750 filed October 28, 1950, now Patent No. 2,704,364, there is disclosed a well logging system which includes a borehole unit 10 such as shown in Fig. 1 having as component parts thereof a transmitter 11 and a receiver 12 of acoustic waves. Such waves may travel as by way of dotted path 13 from transmitter to receiver. Signals transmitted by way of electrical circuits in cable 14 are applied to a unit 15 which produces at its output terminals 16, in response to such signals, a unidirectional voltage which varies as a function of borehole depth in proportion to the time of travel of acoustic waves over path 13.

It will be readily recognized that at least a portion of path 13 is comprised of borehole fluids which, in so far as measurements singularly related to earth formations are concerned, represent an unwanted quantity.

In accordance with prior application of Gerald C. Summers, Serial No. 338,377 filed February 24, 1953, now Patent No. 2,768,701, there is disclosed a system for correcting the voltage such as appears at terminals 16 in dependence upon the fraction of path 13 formed by the borehole fluids. The considerations involved in making such correction include an assumption that the delay in the fluid path is a function of the velocity of sound in the fluid and of the distance from the transmitter and the receiver to the wall of the borehole.

However, it has been found that a desirable correction is one that is a function not only of the properties of the borehole fluids and of the distance from the transmitter and receiver to the borehole wall but also of the acoustic compressional velocity of the formations adjacent the borehole. Since the formation velocity is the principal unknown, production of a correction function dependent upon the unknown presents a problem whose solution is not readily apparent.

Through the provisions of the present invention a solution has been provided for the foregoing problem and for an understanding of the same reference should now be had to the following description taken in conjunction with the accompanying drawings in which:

Fig. 1 is a schematic diagram of a correcting system;

Fig. 3 is a diagrammatic representation of a modification of Fig. 1;

Fig. 5 is a further modification of the invention.

Figure 4:
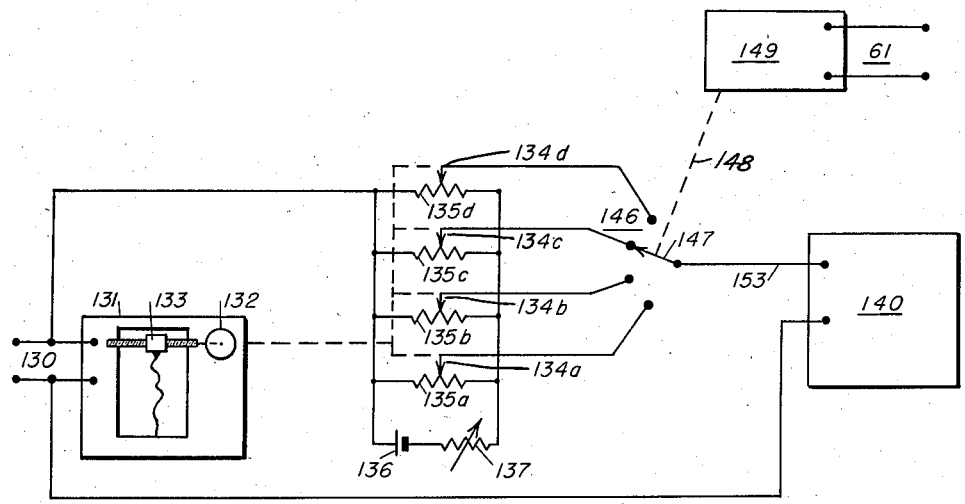
Fig. 4 is a modification of Fig. 3.

The significant variables affecting the voltage $E_{16}$ (the voltage appearing at the output terminals of unit 15) should be kept in mind in order to understand the present invention. The variables and their relationship is expressed in the following equation:

$$E_{16} \alpha \Delta T = \frac{L}{V_f} + \frac{d_b - \frac{d_1 + d_2}{2}}{V_m} \sqrt{1 - \left(\frac{V_m}{V_f}\right)^2} \quad (1)$$

where $\Delta T$ is the time interval between the generation of an acoustic pulse in transmitter 11 and the reception of the pulse at receiver 12;
L is the distance between transmitter and receiver;
$V_f$ is the acoustic compressional velocity of the formation over the distance L;
$d_b$ is the diameter of the borehole;
$d_1$ and $d_2$ are the diameters of the transmitter 11 and receiver 12, respectively; and
$V_m$ is the acoustic velocity of the fluids in the borehole.

In accordance with the present invention, there is produced a first output voltage proportional to the reciprocal of the first factor of the right side of Equation 1. A correction is automatically made in dependence upon variations in borehole diameter ($d_b$) and variations in formation velocity ($V_f$) as in the second term of the right side of Equation 1. More particularly, it has been found that the velocity of sound through an unbounded liquid may be different from the velocity of sound through the same liquid when placed in a confined zone. The variation in velocity will depend upon velocity of sound in the medium which is employed to confine the liquid. Since acoustic velocity logs are run in boreholes extending through formations which may have highly contrasting characteristics at various depths as regards acoustic velocity, it becomes desirable to correct the velocity measurements for such variations in velocity through the mud column as may be caused by variations in acoustic velocity of the adjacent borehole walls. Thus in accordance with the present invention the second term of Equation 1 may be identified as comprising a time interval which will vary in dependence upon the ratio of velocity of sound in the borehole fluids to the velocity of sound in the adjacent formations. The latter correcting function may then be translated to a voltage as may the first term of Equation 1 to correct the resultant measurement for such variations. Further in accordance with the present invention, a second voltage is produced which is proportional to the integral of the first term of Equation 1 versus borehole depth. The two voltages are produced by operating upon the voltage $E_{16}$ using an analog computer shown schematically in Fig. 1. This computer may be characterized as a servo-mechanism having a main loop of two parallel branches in one of which there is provided a subsidiary servo-mechanism loop.

The main servo-mechanism loop includes an amplifier 20 whose output is applied to a first phase winding 21 of a two-phase motor 22. The second phase winding 23 of motor 22 is supplied from an A.C. voltage source 24. The frequency of the source may be 60 cycles or another suitable frequency. A channel 25 also applies the voltage from source 24 to activate a comparator unit, here shown in the form of a mechanical chopper 27. The voltage $E_{16}$ is applied by way of conductor 30 to contact 48 of chopper 27. The output of chopper 27 is applied by way of capacitor 31 to the input impedance 32 (represented dotted) of amplifier 20 which in turn is connected by way of conductor 33 to ground. Conductor 34 completes the circuit to unit 15.

A second voltage is applied to the chopper 27 in such polarity as to be subtracted from the voltage $E_{16}$. It should be kept in mind that as seen by the measuring system voltage $E_{16}$ is a slowly varying unidirectional voltage, the variations being proportional to variations in the time of travel of an acoustic pulse over path 13 as unit 10 is moved along the length of the borehole. The difference between this slowly varying voltage $E_{16}$ and the second voltage is converted by chopper 27 into a constant frequency alternating voltage having amplitude equal to the magnitude of their difference and phase corresponding to the sign of this difference. A first component of the second voltage is generated in the first branch of the main servo-mechanism loop and is derived from a D.C. source 40. The first branch of the main servo-mechanism loop generally follows the broken circle identified by reference character 22a which for the purpose of the following description shall be used collectively to refer to the components forming and co-acting with the actual signal path. In this branch or path source 40 has its negative terminal connected to ground and its positive terminal connected through a potentiometer 41 and a resistor 42 to ground. The voltage appearing between sliding contact 43 and ground is applied to one end of resistor 44. The other end of resistor 44 is connected via conductor 45 to the second contact 46 of the chopper 27 and to one end of resistor 47. The other terminal of resistor 47 is connected to ground. By this means there is applied to contact 46 a component of voltage which is a constant fraction of the voltage between contact 43 and ground. The motor 22 is coupled by way of its shaft, represented by the dotted line 50, to the contact 43 to position contact 43 in dependence upon shaft rotation. Thus amplifier 20, shaft 50 and the electrical circuit including contact 43, resistor 44 and conductor 45 comprises the first branch of the main servo-mechanism loop.

This first loop when closed functions such that the voltage applied to the input of amplifier 20 tends to be reduced to zero. In following the description of operation of this loop it will be helpful to assume that contact 43 is driven in the direction of the arrow 51 in proportion to the expression $$\frac{1}{V_f}$$

That is, assume the desired end result is actually achieved and then the remainder of the system may be fashioned as to comply with the physical requirements necessary to attain this goal. The voltage from battery 40 is made proportional to the spacing L between transmitter 11 and receiver 12 so that rotation of shaft 50 in so far as affected by the first loop is proportional to the first term of the right hand side of Equation 1

$$\frac{L}{V_f}$$

For any given logging instrument, the length L will remain fixed so that the voltage of source 40 may be selected or adjusted to accommodate the particular borehole unit being used and no further adjustments need be made so long as used with its compatible unit.

The second parallel branch of the main servo-mechanism loop roughly follows the broken circle identified by reference character 60. The motion of shaft 50 is utilized through shaft branches 53 and 54. A second input function from the borehole unit 10 utilized in the second loop is applied by way of channel 61 to contribute to the correcting function, (i.e. the second term of the right hand side of Equation 1).

The function on channel 61 is varied in borehole unit 10 in response to means such as arms 63 which sense variations in borehole diameter. The function on channel 61 therefore essentially corresponds in character to a caliper log of the bore hole. This function, together with motions of shafts 53, 54 and the voltages now to be described, together with a secondary servo-mechanism loop closed around amplifier 62, co-act to produce at contact 46 a second component of voltage to correct for variations in the portion of the acoustic travel path comprising borehole fluids.

The motion of shaft 53 is applied to the contact 64 of a potentiometer 65 across which there is applied a voltage $E_2$ from a source 66 which is selected or adjusted to be proportional to the square of the velocity of acoustic waves in the borehole fluid or "mud" ($V_m^2$). Source 66 has its positive terminal connected to ground. The motion of contact 64 is the same as that of contact 43, i.e.

$$\frac{1}{V_f}$$

Therefore the voltage applied to a second potentiometer 67 is proportional to $$\frac{V_m^2}{V_f}$$

The contact 68 of potentiometer 67 similarly is driven as by way of shaft 54 so that the voltage of contact 68 is proportional to the function $$\left(\frac{V_m}{V_f}\right)^2$$

This voltage of contact 68 is applied to one end of resistor p. The other end of resistor p is connected to the junction of resistors q and r at point 69. The end of resistor r opposite point 69 is connected to a third voltage source 70 which has its negative terminal connected to ground and provides a positive voltage $E_3$ which is made proportional to unity so that the voltage at terminal 69 is proportional to the expression $$1-\left(\frac{V_m}{V_f}\right)^2$$

The voltage at terminal 69 is transmitted by way of conductor 75 to the input of the subsidiary servo-mechanism loop and more particularly to the contact 76 of a chopper or converter 77. The output voltage of chopper 77 is transmitted by way of capacitor 78 to the input impedance 78a (shown dotted) of amplifier 62. The output of amplifier 62 excites a first winding of a two-phase motor 79. The second winding of motor 79 is excited from an A.C. source 80 as is the actuating coil 81 of the chopper 77. The shaft of motor 79 drives shaft 91 which is connected to contacts 84, 86, and 93 of potentiometers 83, 85 and 94. A voltage source such as a battery 82 is connected to potentiometer 83. The voltage $E_4$ of battery 82 is made proportional to unity. The contact 84 of potentiometer 83 is connected to potentiometer 85 having contact 86 connected by way of resistor 87 and conductor 88 to the second contact 89 of chopper 77. This circuit completes the subsidiary servo-mechanism loop represented by the broken line arc 90.

As above stated, the input voltage to servo-mechanism loop 90 is proportional to $$1-\left(\frac{V_m}{V_f}\right)^2$$

It is assumed that the rotation of shaft 91 (shown dotted) is proportional to $$\sqrt{1-\left(\frac{V_m}{V_f}\right)^2}$$

This mechanical motion, driving contacts 84 and 86, produces a voltage at contact 89 of chopper 77 proportional to the quantity $$1-\left(\frac{V_m}{V_f}\right)^2$$

The subsidiary servo-mechanism loop assures that the rotational motion of shaft 91 will be as was assumed, i.e.

$$\sqrt{1-\left(\frac{V_m}{V_f}\right)^2}$$

This motion is also transmitted by way of branch shaft 92 to the tap 93 of a potentiometer 94. Here the motion function $$\sqrt{1-\left(\frac{V_m}{V_f}\right)^2}$$

is multiplied by a borehole caliper function.

More particularly, the caliper function on channel 61 ordinarily will be in the nature of a variable resistance whose variations are dependent upon borehole diameter at the location of the borehole unit 10. This resistance as viewed from terminals 61a comprises the impedance $R_0$ of the cable 14 plus a resistance which is a function of borehole diameter $Cd_b$ (i.e. $R=R_0+Cd_b$). Channel 61 is connected to a network comprising a source of potential 100 indicated to be selectively variable, a second source 101 and a resistor 102. Current $i$ then flows through channel 61 and is dependent upon borehole diameter. A potentiometer 103 is connected in parallel with source 101 and resistor 102. The potential of source 100 is adjusted as to be proportional to the voltage $$i\left(R_0+C\frac{d_1+d_2}{2}\right)$$

In this condition and with the polarities of sources 100 and 101 opposed with reference to potentiometer 103, the voltage across potentiometer 103 is proportional to $$d_b-\frac{d_1+d_2}{2}$$

the numerator of the first factor of the second term of Equation 1.

The tap of potentiometer 103 is set at a position proportional to the reciprocal of the unbounded acoustic velocity of the borehole fluid, $V_m$. The voltage between this tap and ground is applied to potentiometer 94 by way of conductor 104 and is there multiplied by the motion of shaft 92 to produce at contact 93 a voltage which is proportional to the second term of the right hand side of Equation 1.

The voltage at contact 93 is applied through resistor 95 and conductor 105 to the juncture common to resistance 47 and contact 46 on chopper 27. Current flows through resistors 95 and 47 because of the voltage at contact 93 and produces a component at contact 46 proportional to the second term on the right side of Equation 1. Resistor 95, as well as resistor 44, is large compared to resistor 47.

Therefore, the system thus far described produces at contact 46 a voltage proportional to the sum of the two terms on the right hand side of Equation 1. The voltage at contact 48 is proportional to the quantity $\Delta t$ on the left hand side of Equation 1. If the voltage at contact 46 is not equal to the voltage at contact 48, the output from chopper 27 applied through condenser 31 to amplifier 20 causes motor 22 to rotate shaft 50 until any inequality is eliminated. Shaft 50 thus rotates in proportion to variations in the expression $$\frac{1}{V_f}$$

With the servo-mechanism loops 22a, 60 and 90 closed and functioning as above described, the motion of shaft 50 may be utilized to produce useful logs which are independent of variations in borehole diameter and are singularly dependent upon the acoustic properties of the formations adjacent the borehole. More particularly, a recorder 110 is provided to record the function $V_f$. It will be remembered that shaft 50 has rotation $$\frac{1}{V_f}$$

and that voltage from source 70 numerically is proportional to 1. Potentiometer 111 and resistances 113 and 114 are provided to accomplish the generation of a voltage proportional to $V_f$. Resistance 114 is very small in comparison with resistance 113, while the sum of resistance 113 and potentiometer 111 is made proportional to $$\frac{1}{V_f}$$

by the rotation of shaft 50. The current through the series combination of potentiometer 111 and resistance 113 and 114 is therefore very closely proportional to $V_f$, so that the voltage between conductor 112 and ground is also proportional to $V_f$.

At the same time a second recorder 120 is provided to integrate the time required for acoustic pulses to travel through the formations so that as borehole unit 10 is moved, for example over a 1,000 foot section of borehole, recorder 120 produces a record showing the total time required for a pulse to travel from the point of beginning to any point along the 1,000 foot travel path. The method and apparatus are claimed in a co-pending application of Robert A. Broding entitled, Measurement of Seismic Travel Time, Serial No. 322,718, filed November 26, 1952. This integration is accomplished by applying the motion of shaft 50 to a ball-and-disc integrator 121. The disk 122 is driven in proportion to the movement of unit 10 in the borehole as by way of a cable pulley 123 and linkage 124. The position of two contacting spheres 125 movable radially in contact with disk 122 and in contact with the surface of a cylinder 126 is controlled by the motion of shaft 50 so that the rotation of shaft 127 is proportional to the integral of the acoustic travel time. This shaft motion is coupled to a battery-potentiometer circuit 128 to convert the motion into a voltage which is then applied to recorder 120.

Figure 2:
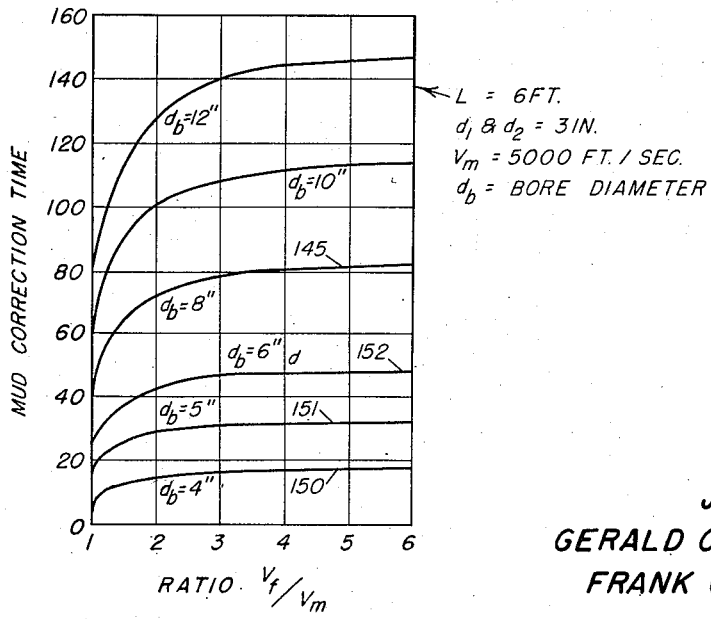
Fig. 2 is a graph showing correction variation as a function of borehole diameter and formation velocity.

The foregoing relates to an exact method of compensating variations in the correction factor and properly applying such corrections for measurement. The graph of Fig. 2 illustrates the variations in the correction time, i.e. the value of the second term on the right hand side of Equation 1 as a function of the ratio of compressional velocity of the formation, $V_f$, to velocity of the mud, $V_m$. It should be noted that the variation of the correction factor from a constant value is greater as the compressional velocity of the formation approaches the velocity of the borehole fluids. In the device represented by Fig. 1, for a given borehole diameter, the correction function generated by the servo-mechanism loops is made to vary in accordance with the function represented by one of the curves shown in Fig. 2. If the borehole diameter varies, then the signal on channel 61 changes the curve as if one were to shift from one of the curves of Fig. 2 to the other.

Figs. 3 and 4 illustrate less exact methods of compensating for variations in the correction function but which may be suitable for field logging operations. In Fig. 3 terminals 130 correspond to terminals 16 of Fig. 1. The voltage at terminals 130 is a slowly varying unidirectional voltage proportional in magnitude to the time of travel of a pulse from transmitter 11 to receiver 12 of Fig. 1. This voltage is applied to a recorder 131 having a stylus driven mechanism generically represented by the motor 132. Motor 132 drives stylus 133 to record the magnitude of the voltage applied to terminals 130. In accordance with the present invention, motor 132 is coupled by way of shaft 132a to a variable tap 134 on a potentiometer 135. Potentiometer 135 is connected in a series loop which includes a battery 136 and an adjustable resistance 137. Conductor 138 interconnects one of terminals 130 and the common juncture 138a between potentiometer 135 and battery 136. Conductor 139 connects the second of terminals 130 to a second recorder 140. The second input terminal of recorder 140 is connected to tap 134 by conductor 141. The potentiometer 135 is tapered in such a manner that variations in resistance between tap 134 and terminal 138a as a function of the voltage applied to terminals 130 is representative of a selected one of the curves shown in Fig. 2.

For example, if a log were to be made in an 8″ borehole with a logging tool having a 3″ diameter, then the taper on potentiometer 135 would have variations corresponding to the 8″ curve 145, Fig. 2. Since the motor 132 controls the position of tap 134, the voltage across a portion of the potentiometer 135 is subtracted from the voltage appearing across terminals 130, thus automatically correcting (a first order correction) for variations in the compressional velocity of the formations. As long as the borehole diameter remains constant, the correction thus made would be satisfactory. However, if further corrections are desired (corrections dependent upon variations in borehole diameter), a system such as shown in Fig. 4 may be employed. Here battery 136 and resistor 137 are connected in series with a plurality of parallel connected potentiometers 135a, 135b, 135c, 135d. The variable taps 134a–d respectively of potentiometers 135a–d are connected to a multiterminal switch 146. The switch arm 147 is connected by link 148 to a control system 149 which may be actuated in dependence upon the signal on channel 61, Fig. 1. This signal varies in direct proportion to variations in borehole diameter. Potentiometer 135a may be tapered to correspond to the 4" curve 150. Potentiometer 135b similarly may correspond to the 5" curve 151. The potentiometer 135c may correspond to the 6" curve 152, and the potentiometer 135d may correspond to the 8" curve 145, etc. Variations in borehole diameter may be transmitted to switch arm 147 to select the proper potentiometer for applying the proper signal to the second recorder 140 by way of conductor 153.

While the foregoing has been given by way of example, it will be understood that the position of switch arm 147 may be controlled dynamically, i.e. by simultaneously calipering and acoustically logging the borehole. Such corrections may also be made by manually selecting the position of switch arm 147 during the course of an acoustic log by observing a previously obtained caliper log of the same hole. Manual coordination between the depth of significant borehole diameter variations and the operation of switch 147 may be employed to compensate the acoustic log.

In Fig. 5 a single recorder has been employed into which the same general type correction as shown in Fig. 3 is applied. Where consistent, the same reference characters have been used as in Fig. 3. In this system the voltage at terminals 130 is applied to the recorder 131 in series with the voltage across the potentiometer 135. The recorder motor 132 drives the potentiometer arm 134. Conductors 160 and 161 close the loop, permitting the correction to correct itself. So long as the correction is small, any errors introduced by this system would be negligible but might be serious if the correction is substantial.

The systems above described represent means that may be used for suitably correcting an acoustic velocity log for errors introduced by reason of travel of acoustic energy through a mud path between the logging tool and the adjacent formations where the correction factor is dependent upon the variations in formation velocity and upon borehole diameter. It is to be understood that while certain modifications have been described in detail, other modifications may now suggest themselves to those skilled in the art and it is intended to cover such modifications as fall within the scope of the appended claims.

What is claimed is:

1. In a logging system in which there is produced a signal proportional to time of travel of acoustic pulses primarily through earth formations between two spaced apart points within a liquid filled borehole and wherein said points are moved with the same spacing to different depth locations along said borehole, the combination which comprises a measuring system to which said signal is applied, means in said system for generating a second signal which is representative of the time of travel of an acoustic pulse over paths extending from said points through the liquids in said borehole to the adjacent borehole wall at one of said locations, means for modifying said second signal in dependence upon the ratio of the velocity of sound in said liquids to the velocity of sound in the formations adjacent said points as the depth of said locations is changed, and means for registering the difference between the first mentioned signal and the modified second signal as a function of the depths of said locations in said borehole.

2. In a logging system in which there is produced a first signal proportional to the time of travel of acoustic pulses primarily through earth formations between two spaced apart points located inside a liquid filled borehole the combination which comprises a measuring system having said signal applied thereto, a servo-mechanism loop in said system in which there is generated a second signal which is representative of the time of travel of an acoustic pulse over paths extending from said points through said borehole fluids to the borehole wall at one of said locations, said loop further including means for modifying said second signal in dependence upon the ratio of a third signal representative of the velocity of sound in said fluids to said first signal, and means connected to said servo-mechanism loop for recording the difference between the first mentioned signal and the modified second signal as a function of depth of said locations in said borehole.

3. In a logging system in which there is produced a first signal proportional to time of travel of acoustic pulses primarily through earth formations between two spaced apart points located inside a liquid filled borehole the combination which comprises a measuring system having said signal applied thereto, a servo-mechanism loop in said system in which there is generated a second signal which is representative of the time of travel of an acoustic pulse over paths extending from said points through the liquids in said borehole to the nearest borehole wall at one location, said loop further including means for modifying said second signal in dependence upon the ratio of the velocity of sound in said liquids to the velocity of sound in said formations at different locations in said borehole, and means connected to said servo-mechanism loop for recording the difference between the first mentioned signal and the modified second signal as a function of the depth of said locations in said borehole.

4. The method of logging the acoustic velocity of earth formations penetrated by a borehole which comprises generating a unidirectional voltage which varies in proportion to variations in the time of travel of an acoustic pulse over the highest velocity path between two spaced apart points located inside said borehole, generating a correcting function which varies in dependence upon variations in diameter of said borehole, the velocity of sound in said earth formations, and upon said voltage, combining said correcting function and said unidirectional voltage, and recording the combined function in dependence upon the depth of said points in said borehole.

5. In a well logging system in which there is produced a signal proportional to the time of travel of acoustic pulses from a transmitter in a borehole filled with liquid to the adjacent borehole walls and thence through formations to a point adjacent a receiver spaced from said transmitter in said borehole and thence through said liquid to said receiver the combination which comprises means having said signal applied thereto and including an electromechanical loop adapted to produce a correction function having a first factor which varies in proportion to the ratio of the combined distances between said transmitter and receiver and the adjacent walls to the velocity $V_m$ of sound in said liquid which factor is automatically decreased by a second factor $$\sqrt{1-\left(\frac{V_m}{V_f}\right)^2}$$

where $V_f$ is the velocity of sound in said formations, means adapted to subtract said correction function from said signal, and means for recording the difference signal as a function of depth of said points in said borehole.

6. In a logging system in which there is produced a signal proportional to the time of travel of acoustic pulses from a transmitter positioned in a borehole filled with liquid to the adjacent borehole walls and thence through formations to a point adjacent a receiver positioned in said borehole and then to said receiver the combination which comprises a recording system responsive in a first sense to the depth of said transmitter and receiver in said borehole and responsive in a second sense to a modification of said signal, and signal modifying means including a pair of servo-mechanism loops which contribute to the production of a rotational output coupled to a recorder, a first of said loops being responsive to said rotational output for developing a first operator proportional to a first function which is the ratio of the distance between said transmitter and receiver divided by the velocity of sound in said formations, a second of said loops responsive to said rotational output and adapted to develop a second operator which is proportional to the ratio of the combined distances between said transmitter and receiver and the adjacent walls of said borehole to the velocity $V_m$ of sound in said liquid which second operator is automatically decreased by a factor $$\sqrt{1-\left(\frac{V_m}{V_f}\right)^2}$$

where $V_f$ is the velocity of sound in said formations, means adapted to subtract said first and second operators from said signal, and means responsive to the difference between said signal and said first and second operators for maintaining said rotational output proportional to said first function.

7. In a logging system in which there is produced a first signal proportional to the time of travel of acoustic pulses from a transmitter positioned in a borehole filled with liquid to the adjacent borehole walls and thence through formations to a point adjacent a receiver positioned in said borehole and thence to said receiver the combination which comprises means having a physical control element for producing upon actuation thereof a second signal which at each location in said borehole has a value dependent in part upon the ratio of the velocity of sound in said liquids to the velocity of sound in said formations at each said location, means responsive to said first signal for actuating said control element in proportion thereto, means for subtracting said second signal from said first signal, and means for recording the difference between said signals as a function of depth of said transmitter and receiver in said borehole.

8. The method of logging the acoustic velocity of earth formations penetrated by a borehole which comprises generating a unidirectional voltage which varies in proportion to variations in the time of travel of an acoustic pulse over the highest velocity path between two spaced apart points located inside said borehole, generating a correcting function which varies in dependence upon the diameter of said borehole, the velocity of sound in said earth formations, and upon said voltage, combining said correcting function and said unidirectional voltage, and recording the combined function in dependence upon the depth of said points in said borehole.

References Cited in the file of this patent

UNITED STATES PATENTS

| | | |
|---|---|---|
| 2,275,736 | Cloud | Mar. 10, 1942 |
| 2,704,364 | Summers | Mar. 15, 1955 |
| 2,768,701 | Summers | Oct. 30, 1956 |